No. 664,207. Patented Dec. 18, 1900.
R. B. BENJAMIN.
RAILWAY SIGNALING DEVICE.
(Application filed Feb. 5, 1900.)
(No Model)
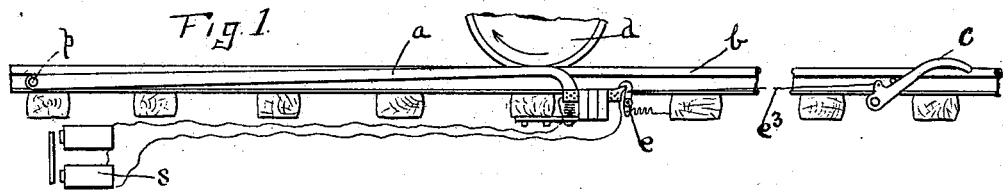
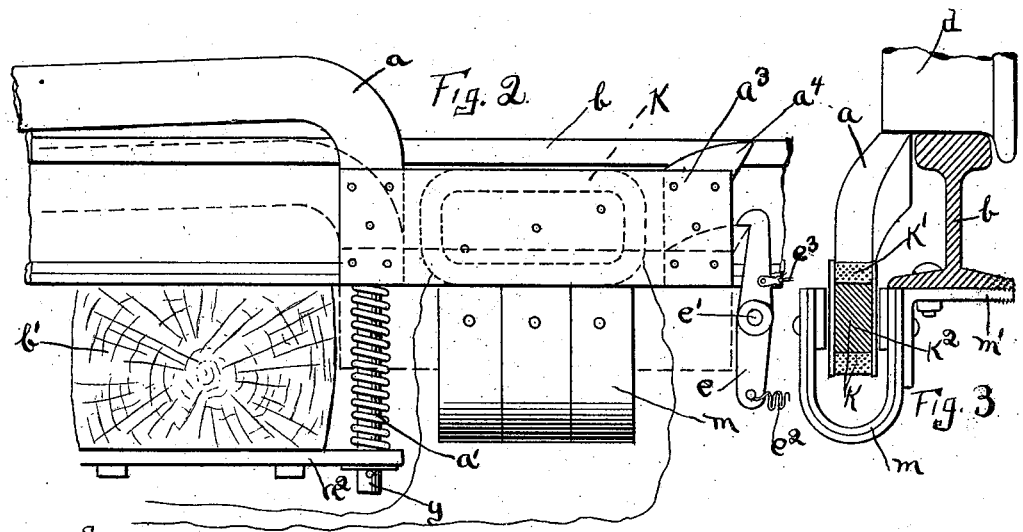
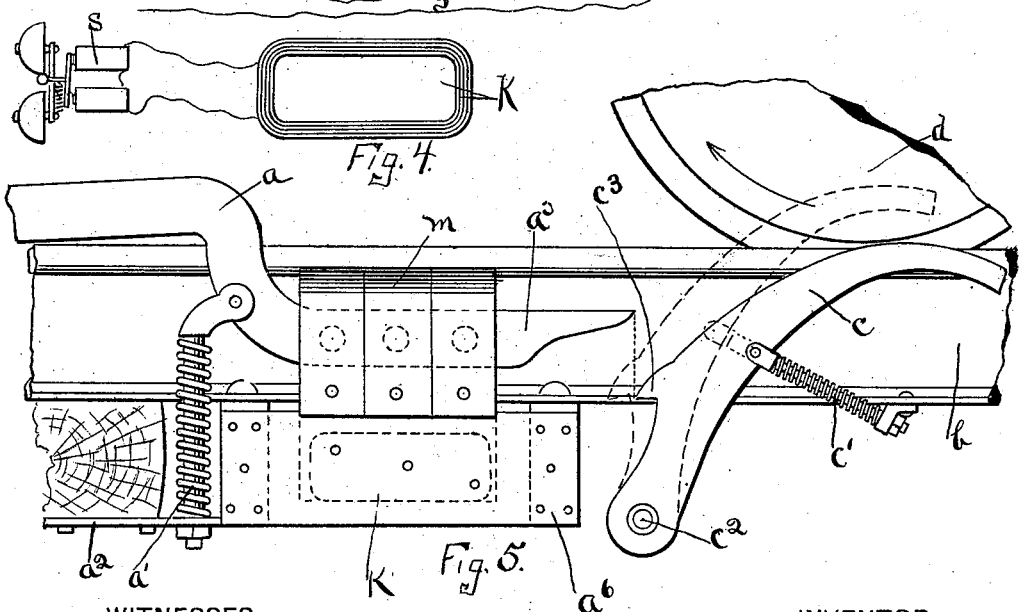

UNITED STATES PATENT OFFICE.

REUBEN B. BENJAMIN, OF CHICAGO, ILLINOIS, ASSIGNOR OF ONE-HALF TO RODNEY B. SWIFT, OF SAME PLACE.

RAILWAY SIGNALING DEVICE.

SPECIFICATION forming part of Letters Patent No. 664,207, dated December 18, 1900.

Application filed February 5, 1900. Serial No. 4,085. (No model.)

*To all whom it may concern:*

Be it known that I, REUBEN B. BENJAMIN, a citizen of the United States, residing at Chicago, in the county of Cook and State of Illinois, have invented a certain new and useful Improvement in Railway Signaling Devices, of which the following is a full, clear, concise, and exact description, reference being had to the accompanying drawings, forming a part of this specification.

My invention relates to a signaling apparatus for railways and the like, my object being to provide a signaling device adapted to be actuated by the passage of a train or vehicle over the track.

In accordance with my invention I provide an electric generator having a movable part adapted to be reciprocated relatively to the stationary part, means being provided whereby the passage of a train or car serves to move the movable part of the generator in one direction against the tension of a spring or other power-storing device, a catch or lock serving to hold the movable part in the new position to which the same is moved. At another portion of the track a trip device is provided, adapted to be actuated by the passage of the train to release said catch or lock and permit the movable part of the generator to return to the initial position. A suitable signaling device is associated with the generator and is adapted to be actuated by the current generated thereby. I preferably associate the movable part of the generator with a bar or lever adapted to be engaged by the wheels of the vehicle, the trip device being also arranged to be engaged and operated by the wheels of the vehicle. When it is desired to actuate a single-stroke signal—as, for instance, a single-stroke bell—in which case but a single impulse of current is required, I place the trip device at such a distance in advance of the device which operates the generator that the train may completely pass the device which moves the movable element of the generator to the locking position before the train engages the trip device. The passage of the train thus serves to move the movable element of the generator into the locked position, in which position it remains until the train has completely passed this point, after which it engages the trip device, and the movable part is released and moved by the spring or other device to generate the necessary current for controlling the signaling device. When it is desired to actuate a signal repeatedly throughout a period of time, in which case a number of successive impulses of current is required, I locate the trip device but a short distance in advance of the mechanism which stores power in the generator. For instance, the passage of one truck of a car may serve to move the movable part of the generator to the locked position, in which position it will remain until the next succeeding truck of the car engages the trip device. The passage of each pair of trucks of the train may thus serve to send a current impulse through the signaling device.

I preferably employ for the generator a permanent magnet and an armature-winding adapted to partake of a relative movement of reciprocation to induce the operating-current. I preferably mount the armature in a stationary position and mount the permanent magnet as the movable part of the generator.

I have illustrated my invention in the accompanying drawings, in which—

Figure 1 is a view of the device of my invention in process of operation. Fig. 2 is a detail side view of the same. Fig. 3 is a view showing the armature and rail in section. Fig. 4 is a detached view of the armature connected with a signaling device. Fig. 5 is a view of a modification of my invention.

Like letters refer to like parts in the several figures.

An inclined bar $a$ is pivoted to the rail $b$ at the point $p$. At its other extremity the bar $a$ carries the extension $a^3$, which in its turn holds the armature $k$, and also has a lug $a^4$ adapted to be engaged by the catch $e$. The bar $a$ is held in its elevated position by a spring $a'$ acting upon a plunger $g$, passing through a hole in the support $a^2$. The support $a^2$ is bolted to the tie $b'$. The catch $e$, pivoted at $e'$, is held in normal position by means of the spring $e^2$ and is connected with the trip $c$ by means of the wire or other connecting means $e^3$. The magnets $m$ are bolted to the bracket $m'$, which in turn is bolted to the under side of the rail $b$. The armature $k$, consisting of the winding $k'$ and the soft-iron core $k^2$, is carried on the inside of the extension-piece $a^3$ and is connected by means of wires to the signaling device or semaphore $s$.

In Fig. 5 a modification of the device is shown in which the magnets $m$ are carried upon the continuation $a^5$ of the bar $a$, and the poles thereof are adapted to move on the exterior of the armature $k$, which in this case is carried by the plates $a^6$, bolted to the under side of the rail $b$. In this construction the catch $e$ is eliminated and the trip $c$ so constructed as to perform the functions thereof. The trip $c$ is pivoted at $c^2$ near the generator in such a position that the projection $c^3$ will engage the extremity of the bar $a$ when the latter is forced down. A spring $c'$ controls the movements of the trip $c$.

The operation of the device of my invention is as follows: The wheel $d$ of a passing train presses down the bar $a$, which carries with it the armature $k$ until the lug $a^4$ is caught and held by the catch $e$ and the spring $a'$ is compressed. As the train passes along the wheel $d$ strikes the trip $c$, which being forced down moves, by means of the wires $e^3$, the catch $e$, and thus releases the bar. A current is thus generated, which is communicated by wires to the signaling device $s$, thus giving notice of the passage of the train.

The distance between the generator and the trip may be varied as occasion demands. In Fig. 5 the trip is shown so situated that the wheel after depressing the bar $a$ immediately strikes the trip and releases the bar before the next wheel has time to pass. The second and following wheels each perform the same action as the first, thus giving a series of signals.

Having described my invention, what I claim as new, and desire to secure by Letters Patent, is—

1. The combination with a railway-track, of an electric generator having a movable part adapted to be reciprocated relatively to the stationary part, means operated by the passage of a car for moving said movable part in one direction, a catch or lock for holding said movable part in the position to which the same is thus moved, a trip device at another portion of the track adapted to be operated by the passage of the train to release said catch or lock and permit the return of said movable part, and a suitable signaling device adapted to be actuated by the current from said generator, substantially as described.

2. The combination with a railway-track, of an electric generator having a movable part adapted to be reciprocated relatively to the stationary part, means operated by the passage of a car for moving the movable element of said generator in one direction, a spring or equivalent device in which energy is adapted to be stored by said movement, a catch or lock adapted to hold said movable part in the position to which the same is thus moved, a trip device at another portion of the track adapted to be operated by the passage of the car for releasing said lock to permit said spring or equivalent device to return the movable part of the generator, and a signaling device adapted to be actuated by the current from said generator, substantially as described.

3. The combination with a railway-track, of an electric generator having a movable part adapted to be reciprocated relatively to the stationary part, a lever adapted to be engaged by the wheels of a passing car to move said movable part of the generator in one direction, a catch or lock for holding said movable part in the position to which the same is thus moved, a trip device at another portion of the track adapted to be engaged by the wheels of the passing car to release said catch or lock to permit the return of said movable part and a signaling device adapted to be actuated by the current from said generator, substantially as described.

4. The combination with a railway-track, of an armature-winding situated in a stationary position, and a signaling device connected in circuit therewith, a permanent magnet adapted to partake of a reciprocating movement relatively to said winding, means actuated by the passage of a car for moving said magnet in one direction, a catch or lock for holding the same in the new position and a trip device at another portion of the track adapted to be engaged by the passing car to release said catch or lock to permit the return of said magnet, substantially as described.

5. In a railway signaling device, the combination, with the magnet $m$ and armature $k$, of the bar $a$, imparting a relative movement of translation to said magnets and armature, the spring $a'$, for returning said bar when released, the catch $e$, for controlling the motion of said bar, the trip $c$, for actuating said catch, and the signaling device $s$, substantially as described.

In witness whereof I have hereunto subscribed my name in the presence of two witnesses.

REUBEN B. BENJAMIN.

Witnesses:
W. CLYDE JONES,
M. R. ROCHFORD.